3,822,132
HEAT RESISTANT DYES FOR POLYESTER
FILM PRODUCTS
C. Shelburn Hunter, Rochester, N.Y., assignor to Eastman
Kodak Company, Rochester, N.Y.
No Drawing. Continuation-in-part of abandoned application Ser. No. 822,032, May 5, 1969. This application May 24, 1971, Ser. No. 146,501
Int. Cl. G03c 1/84
U.S. Cl. 96—84 R
15 Claims

ABSTRACT OF THE DISCLOSURE

Certain azabenzanthrone and diazabenzanthrone dyes have been found (a) to be peculiarly resistant to spontaneous high temperature degradation, and
(b) to be particularly useful as colorants for photographic film products made by extruding a dyed polyester film base.

In combination with a green dye such as 1,4-dihydroxy-5,8-di-p-toluidino anthraquinone or 1,4-di-p-butyl anilino-5,8-dihydroxy anthraquinone, which has the ability to inhibit or minimize edge fog in light sensitive film products having a polyester substrate, the red azabenzanthrone or diazabenzanthrone dye is particularly useful in the form of an approximately "neutral" colored film substrate.

---

This patent application is a continuation-in-part of U.S. patent application Ser. No. 822,032, filed May 5, 1969, now abandoned.

The present invention relates to internally dyed polyester materials, particularly light sensitive film products having polyester substrates, which are resistant to the formation of edge fog.

It is well known that polyester polymers consisting mainly of linear chains of repeating residues of glycols containing from 2 to 12 carbon atoms and dicarboxylates containing from 4 to 20 carbon atoms have unusually high melting points when their average molecular weights are above about 20,000. For example, the melting point of commercially produced poly(ethylene terephthalate) having an intrinsic viscosity of 1 and a molecular weight of about 30,000 is about 264° C., while the melting points of many other linear polyesters of commercial importance today are still higher.

Because of their very high melting points, such polyester materials present an unusually difficult problem to dye chemists, whose task it is to compound a wide variety of colored polyesters for such important markets as the textile and floor covering markets, and the like. That problem relates to the generally relatively poor heat stability of colorant materials when polyesters containing the colorant materials dispersed or dissolved therein are subjected to conventional commercial heat-forming operations. In such heat-forming operations, such as extruding films and fibers, for example, the mixture of polyester and colorant must be maintained in the molten condition (at a temperature above the melting point of the polyester) for a fairly extended period of time, of at least about 15 minutes usually, and sometimes as much as 60 minutes or more. Under such extreme temperature conditions, almost every organic dye material tested has been found to be insufficiently heat stable to be acceptable for use as a colorant in heat-formed polyester articles.

In order to qualify as an "acceptable" colorant for heat-formed polyester articles, a colorant must not only have the requisite heat stability, per se, but it must also have excellent color stability in the molten polyester environment at temperatures of at least about 275° C. for at least 30 minutes (preferably for at least about 60 minutes to simulate actual production conditions). In addition, the colorant must be compatible with the polyester in amounts up to at least about 0.01 weight percent, which includes most practical use levels. However, sometimes as little as 3 p.p.m. has proven useful. Compatibility can readily be ascertained by observing a blend of colorant with polyester that has been heated above 275° C. (and above the melting point of the polyester) for 15–30 minutes. Incompatibility is evidenced by the gathering together in the polyester of distinct "spots" or fairly large particles of colorant.

Still another requirement that a truly widely useful colorant for polyester articles must meet is that relating to the resistance of the colorant, in the polyester environment (wherein the polyester is in both the molten and solidified states) to sublimation. Some organic colorants that might otherwise be considered acceptable for use as colorants in heat-formed polyester articles fail in this respect. Sublimation contributes to many undesirable effects, including instability of the color in the final product, and difficulty in controlling (and reproducing) colors from the standpoint of the manufacturers of the heat-formed products. In addition, colorants for use in photographic films must not poison the radiation sensitive layers.

Hence, acceptable colorants for heat-molded polyester products must be at least (a) chemically (color) stable in the molten polyester environment for an extended period of time, (b) compatible with the polyesters at practical usage levels of at least about 0.01 weight percent, and (c) must not sublime out of, or away from, the polyester, either in the molten state or in the solid state, even after a prolonged period of time.

It has now been discovered that certain azabenzanthrone and diazabenzanthrone materials, surprisingly, have the requisite heat stability, compatibility and non-sublimation properties in the molten polyester environment to qualitfy them as "acceptable" colorants for the commercial manufacture of colored, heat-formed polyester articles. The materials that have been discovered to have the requisite very high level of heat stability and compatibility are those azabenzanthrone or diazabenzanthrone materials having a structure selected from the group consisting of

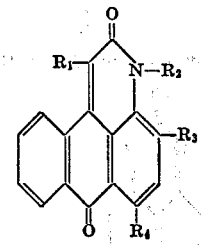

and

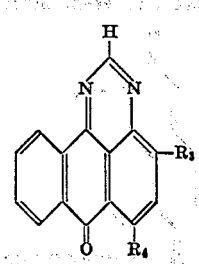

wherein $R_1$, $R_2$, $R_3$ and $R_4$, are selected from the group consisting of

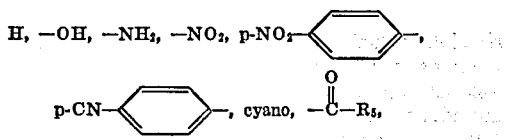

substituted amino, amido, sulfonamido, alkyl, aryl, aralkyl, alkaryl; at least one $R_1$, $R_2$, $R_3$ and $R_4$ being other than H, and at most two of $R_1$, $R_2$, $R_3$ and $R_4$ having radical weights above about 70; and $R_5$ is the same as $R_1$, $R_2$, $R_3$, and $R_4$.

It is particularly advantageous that a wide range of colors is represented by this group of materials, so that, by blending them, and by using one or more of them in combination with other compatible colorant materials, a very wide range of tinted or colored materials can be made using the colorants of the present invention.

A particularly preferred group of the azabenzanthrone and diazabenzanthrone colorant blends (with one or more of the polyesters described hereinbefore) include heat-formed compositions which contain the polyester(s) plus one or more of the following colorant materials. (The names in parenthesis after the name of the colorant is the tint of the colored polyester containing the colorant.)

2,3-dihydro-1-ethoxycarbonyl-3-methyl-2-oxo-6-p-toluene-sulfonamido-3-azabenzanthrone (yellow)

(a)
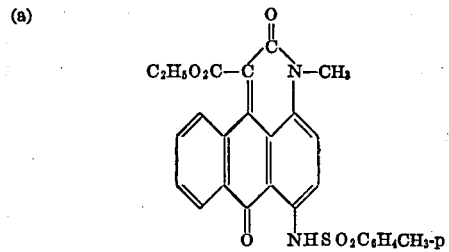

2,3-dihydro-3-methyl-2-oxo-1-p-toluidino-3-azabenzanthrone (yellow)

b)
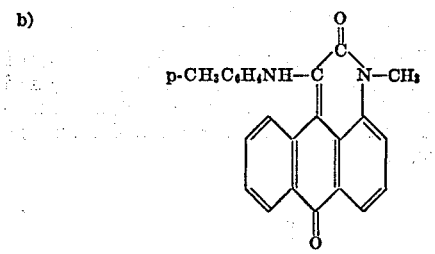

6-amino-4-p-toluidino-1,3-diazabenzanthrone (orange)

(c)
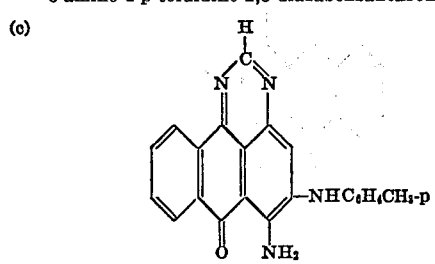

2,3-dihydro-6-[N-3-(dimethylamino)-propylamino]-3-methyl-2-oxo-1-phenyl-3-azabenzanthrone (red)

(d)
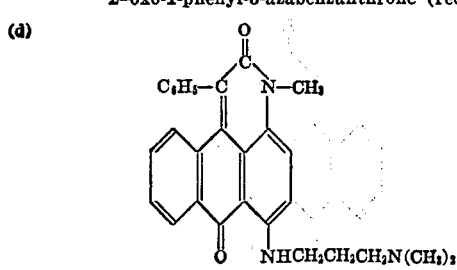

4-p-chloroanilino-1,3-diazabenzanthrone (orange)

(e)
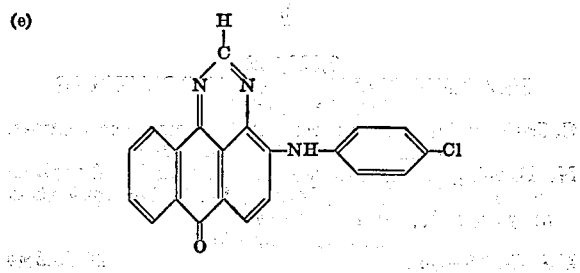

2,3-dihydro-3-methyl-6-[p-(1-methylbutyl)anilino]-2-oxo-1-phenyl-3-azabenzanthrone (violet)

(f)
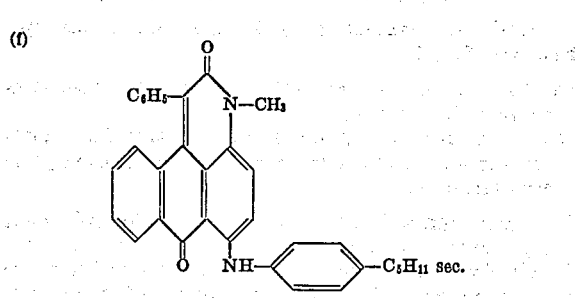

4-anilino-6-[N-(2,4-dichlorobenzoyl)amino]-1,3-diaza-benzanthrone (orange)

(g)
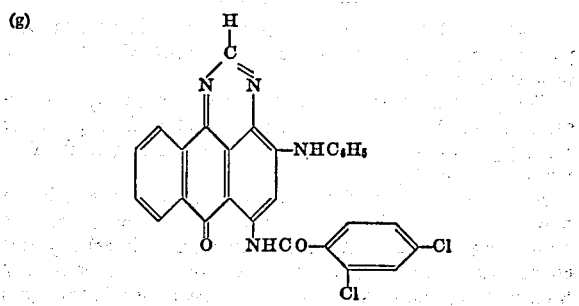

2,3-dihydro-6-(2,4-dimethylanilino)-1-ethoxycarbonyl-3-methyl-2-oxo-3-azabenzanthrone (violet)

(h)
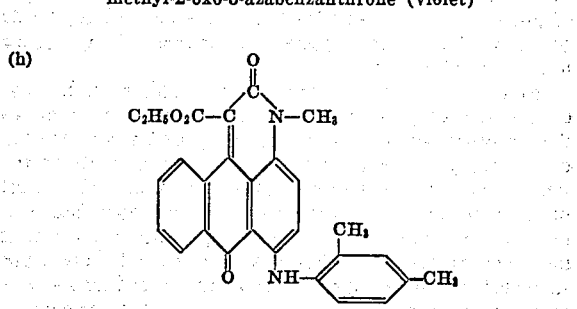

2,3-dihydro-6-p-chloroanilino-1-cyano-3-methyl-2-oxo-3-azabenzanthrone (blue)

(i)
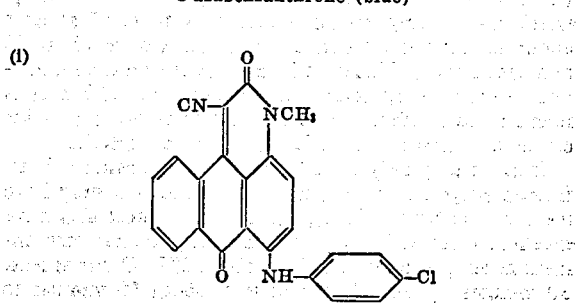

2,3-dihydro-1-ethoxycarbonyl-3-methyl-2-oxo-6-p-toluidino-
3-azabenzanthrone (magenta)

(j)
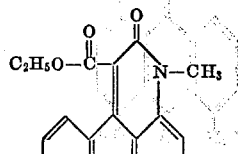

2,3-dihydro-1-ethoxycarbonyl-3-methyl-2-oxo-6-m-toluidino-
3-azabenzanthrone (magenta)

(k)
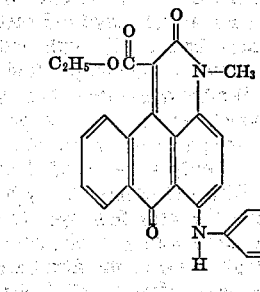

2,3-dihydro-1-ethoxycarbonyl-3-methyl-2-oxo-6-o-toluidino-
3-azabenzanthrone (magenta)

(l)
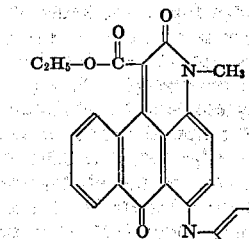

2,3-dihydro-3-methyl-2-oxo-6-p-toluidino-3-
azabenzanthrone (red)

(m)
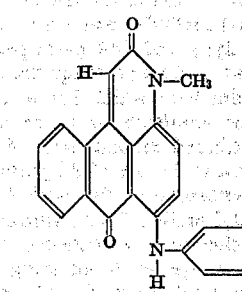

2,3-dihydro-6-(4'-t-amylanilino)-1-ethoxycarbonyl-3-methyl-
2-oxo-3-azabenzanthrone (magenta)

(n)
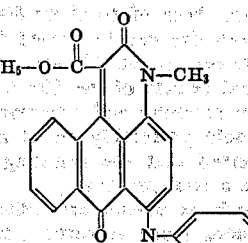

2,3-dihydro-3-methyl-6-(2,4-dimethylanilino)-1-phenyl-
3-azabenzanthrone (magenta)

(o)
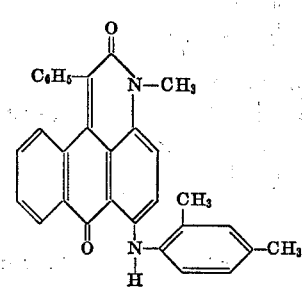

It is noteworthy that, whereas the azabenzanthrone and diazabenzanthrone materials described above can be generically considered to be "anthracene-derived" dyes, it is recognized that by far the greater majority of such "anthracene-type" dyes (including many anthraquinone-type dyes) are either unstable or incompatible in polyester systems such as those about which the present invention is concerned. For example, dyes of the following type have been found to spontaneously degrade excessively when they are held in molten poly(ethylene terephthalate) for one hour at a temperature of 280° C. (at the 500 p.p.m. level).

(p)
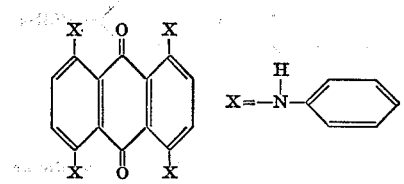

1,4,5,8-tetraanilino anthraquinone (q)
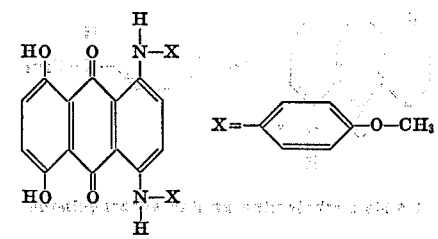

1,4-bis-p-methoxyanilino-5,8-dihydroxy anthraquinone (r)
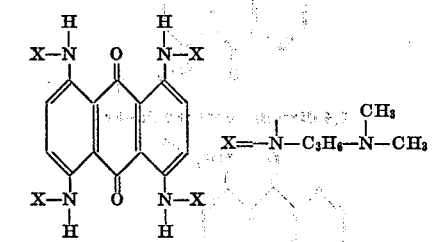

1,4,5,8-tetra(γ-dimethylaminopropylamino) anthraquinone (s)
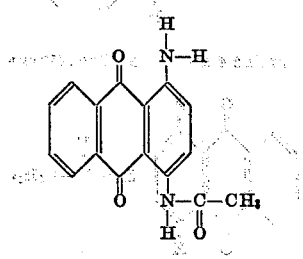

(t) 1-amino-4-acetamido anthraquinone (u) 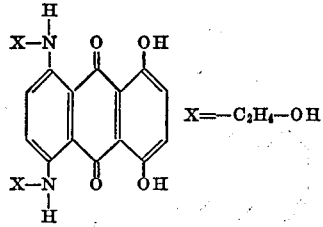
1,4-dihydroxy-5,8-di-B-hydroxyethylamino anthraquinone (u) 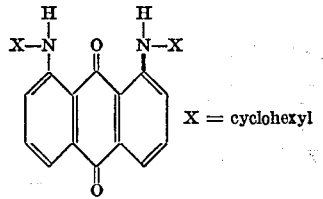
1,8-bis-cyclohexyl anthraquinone (v) 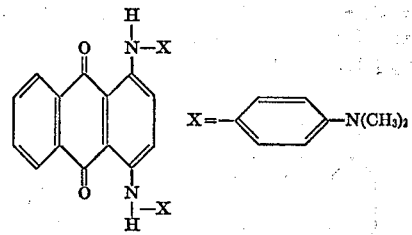
1,4-bis-p-(N,N-dimethyl)anilino anthraquinone (w) 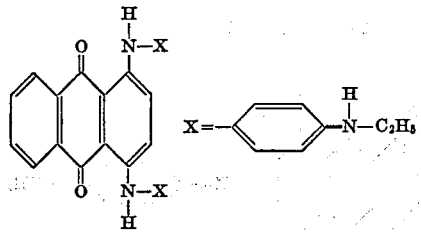
1,4-bis-p-ethylamino anilino anthraquinone (x) 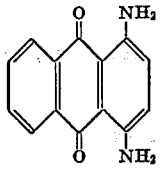
1,4-diamino anthraquinone (y) 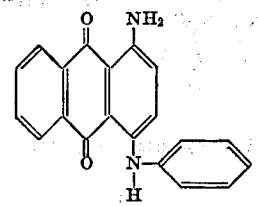
1-amino-4-anilino anthraquinone (z) 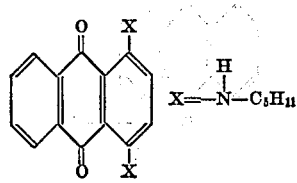
1,4-diamylamino anthraquinone (z-1) 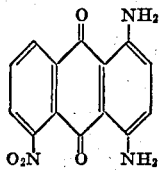
1,4-diamino-8-nitro anthraquinone In one of the preferred embodiments of the present invention, a red azabenzanthrone is used in combination with a heat-stable, compatible, non-subliming green dye in a thin polyester film (0.5 to 30 mils in thickness) in order to yield a substrate for a photographic film which is essentially "neutral" in color and in which the problem of "edge fog" is minimized. Examples of this preferred embodiment is the use of a combination of a red azabenzanthrone dye such as 2,3-dihydro-3-methyl 2-oxo-6-p-toluidino-3-azabenzanthrone (I) with either (or a mixture thereof) 1,4-dihydroxy-5,8-di-p-toluidino-anthraquinone (II) or 1,4-di-p-butyl anilino-5,8-dihydroxy anthraquinone (III), which are stable, compatible green dyes. Dyes II and III are particularly valuable for use in polyester film bases not only because of their excellent high temperature stability and compatibility but also because they rank among the very few dyes (necessary in this end use in combination with a stable, compatible red dye to obtain a "neutral" color in the film base) that absorb efficiently in the near infra-red (700–800 nm.) region of the electromagnetic spectrum. It is apparently this pecular ability to absorb efficiently in the near infra-red region of the spectrum that causes these dye combinations to inhibit edge fog so markedly when they are used in sufficiently small amounts in the film base to create acceptable, low optical densities. For example, in a typical commercial photographic film product having a four-mil thick poly(ethylene terephthalate) substrate, whereas only about 0.1 optical density is generally adequate to prevent most edge fog, it is often desirable for other reasons well known to the photographic art that the optical density of the substrate be at most about 0.5, and preferably at most about 0.35 (for panchromatic films) and at most about 0.15 for color films. See the disclosure of U.S. Pat. 2,622,026 for details about red/cyan dye combinations useful in cellulose ester film substrates.

A detailed example of a particularly preferred embodiment of the present invention is the use of 88 parts per million of 2,3-dihydro-3-methyl-2-oxo-6-p-toluidino-3-azabenzanthrone (a red dye) and 144 parts per million of 1,4-dihydroxy-5,8-di-p-toluidino-anthraquinone (a green dye) in a polyester film base which has a layer of conventional photographic emulsion over one surface. Another particularly preferred embodiment of this aspect of the present invention is the use of 80 parts per million of the same red azabenzanthrone dye with 140 parts per million of 1,4-di-p-butyl anilino-5,8-dihydroxy anthraquinone (green) in an otherwise conventional photographic film element having a polyester (containing these dyes) substrate. In these particularly preferred embodiments, the visually "neutral" color can be obtained by simply "balancing" appropriate amounts of the respective red and green dyes. In general, however, the amount of red dye can be varied from about 40 to about 600 parts per million, while the green dye can be varied from about 60 to about 1000 parts per million. Greater amounts can be used, but the optical density of the film base (or the resulting negative after exposure and development of the sensitized article) should preferably be at most about 0.3 unless it is preferred that the resulting developed article not be used as a transparency.

Other materials, such as plasticizers, other colorant materials, and dispersions (such as carbon, titanium dioxide, and/or silica) can also be present in the colored, heat-formed compositions of this invention. Particularly preferred polyesters for use in the practice of this invention include poly(ethylene terephthalate) and poly(1,4-cyclohexylenedimethylene terephthalate) and copolymers containing them.

The polyester compositions of this invention can be manufactured by any of a number of methods which will be immediately evident to those artisans in this field. Thus, the powdered colorant can simply be mechanically blended with granules, pellets or flakes of the polyester in appropriate amounts at any time prior to the point where the polyester is melted and heat-formed. Or, if desired, a "concentrate" of dye and polyester can be prepared separately, and then blended with more of the polyester as desired or needed to accomplish the final colored, heat-formed article. Colorants can also be present when the polyester is formed. Heat-forming can be accomplished in any manner desired, in which manner the blend of colorant and polyester is melted (or sufficiently softened to cause it to take a particular form), heat-formed by extrusion or compression or vacuum molding, for example, and then cooled and solidified. For example, the heat-formed articles of this invention include (but are not limited to) films, coatings, molded articles, fibers, and the like. The articles can also be processed in any of a number of ways subsequent to the heat-forming, without detracting from any of the benefits that can be obtained by practicing this invention. For example, they can be cut, spliced, punched, subjected to crystallization, even chopped into small pieces, and even remelted and heat-formed again, if desired.

The invention has been described in detail with particular reference to preferred embodiments thereof, but it will be understood that variations and modifications can be effected within the spirit and scope of the invention.

What is claimed is:

1. A photosensitive polyester film article having improved resistance to edge fog formation, said film article comprising a polyester film substrate having an optical density up to about 0.5 and, on at least one side of said film substrate, a photosensitive layer; said polyester film substrate being approximately neutral in color and comprising (1) at least one red dye selected from the group of dyes having structure:

(A)

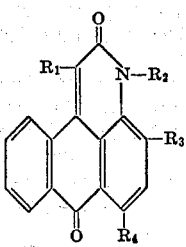

or (B)

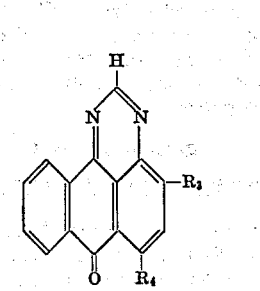

wherein $R_1$, $R_2$, $R_3$ and $R_4$ are selected from the group consisting of

H, —OH, —NH$_2$, —NO$_2$, p-NO$_2$—⟨⟩—, p-CN—⟨⟩—, cyano, —C(O)—R$_5$,

N-3-(dimethylamino)-propylamino, N-(2,4-dichlorobenzoyl)amino, 4'-t-amylanilino, p-chloranilino, 2,4-dimethylanilino, p-(1-methylbutyl)anilino, o-, m-, and p-toluidino, amido, sulfonamido, alkyl, aryl, and alkaryl; at least one of $R_1$, $R_2$, $R_3$, and $R_4$ being other than H, and at most two of $R_1$, $R_2$, $R_3$, and $R_4$ having radical weights above about 70; and $R_5$ is the same as $R_1$, $R_2$, $R_3$, or $R_4$; and (2) at least one green dye selected from the group consisting of 1,4-dihydroxy-5,8-di-p-toluidino anthraquinone and 1,4-di-p-butyl anilino-5,8-dihydroxy anthraquinone; said green dye being 1,4-dihydroxy-5,8-di-p-toluidino anthraquinone when said red dye is selected from group (A) or (B) and when said green dye is 1,4-di-p-butyl anilino-5,8-dihydroxy anthraquinone, said red dye is selected from group (B).

2. A photosensitive polyester film article as in claim 1, wherein said polyester substrate consists essentially of at least one linear polyester of repeating polymethylene glycol and diacyl radicals, the number of carbon atoms in the polymethylene groups being from 2 to 8.

3. A photosensitive polyester film article as in claim 2, wherein said polyester is poly(ethylene terephthalate).

4. A photosensitive polyester film article as in claim 2, wherein said polyester is poly(1,4-dimethylenecyclohexylene terephthalate).

5. A photosensitive polyester film article as in claim 1, wherein said green dye is 1,4-dihydroxy-5,8-di-p-toluidino anthraquinone and said red dye is

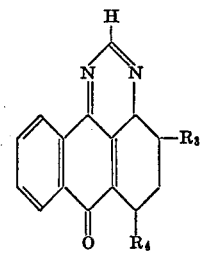

wherein $R_3$, and $R_4$ are selected from the group consisting of

H, —OH, —NH$_2$, p-NO$_2$—⟨⟩—, p-CN—⟨⟩—, cyano,

—C(O)—R$_5$,

N-3-(dimethylamino)-propylamino, N-(2,4-dichlorobenzoyl)amino, 4'-t-amylanilino, p-chloroanilino, 2,4-dimethylanilino, p-(1-methylbutyl)anilino, o-, m-, and p-toluidino, amido, sulfonamido, alkyl, aryl, and alkaryl; at least one of $R_3$, and $R_4$ being other than H, and at most each of $R_3$, and $R_4$ having radical weights above about 70; and $R_5$ is the same as $R_3$ or $R_4$.

6. A photosensitive polyester film article as in claim 1, wherein said green dye is 1,4-dihydroxy-5,8-di-p-toluidino anthraquinone and said red dye is

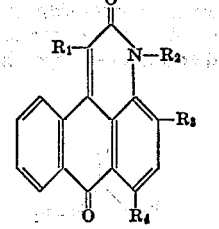

wherein $R_1$, $R_2$, $R_3$, and $R_4$ are selected from the group consisting of H, —OH, —NH$_2$, p-NO$_2$—⟨⟩—,

N-3-(dimethylamino)-propylamino, N-(2,4-dichlorobenzoyl)amino, 4'-t-amylanilino, p-chloranilino, 2,4-dimethylanilino, p-(1-methylbutyl)anilino, o-, m-, and p-toluidino, amido, sulfonamido, alkyl, aryl, and alkaryl; at least one of $R_1$, $R_2$, $R_3$, and $R_4$ being other than H, and at most two of $R_1$, $R_2$, $R_3$ and $R_4$ having radical weights above about 70; and $R_5$ is the same as $R_1$, $R_2$, $R_3$, or $R_4$.

7. A photosensitive polyester film article as in claim 1, wherein said green dye is 1,4-di-p-butyl anilino-5,8-dihydroxy anthraquinone and said red dye is

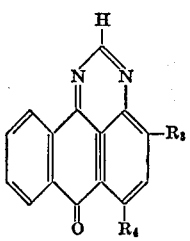

wherein $R_3$ and $R_4$ are selected from the group consisting of H,

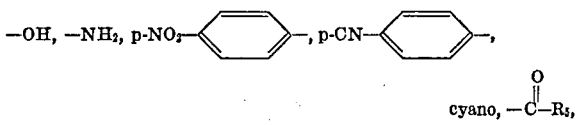

N-3-(dimethylamino)-propylamino, N-(2,4-dichlorobenzoyl)amino, 4'-t-amylanilino, p-chloroanilino, 2,4-dimethylanilino, p-(1-methylbutyl)anilino, o-, m-, and p-toluidino, amido, sulfonamido, alkyl, aryl, and alkaryl; at least one of $R_3$ and $R_4$ being other than H, and at most two of $R_1$, $R_2$, $R_3$ and $R_4$ having radical weights above about 70; and $R_5$ is the same as $R_3$ or $R_4$.

8. A photosensitive polyester film article having improved resistance to edge fog formation, said film article containing an approximately neutral in color polyester substrate and, on at least one side of said polyester substrate, a photosensitive emulsion layer; said polyester film substrate comprising the red dye 2,3-dihydro-3-methyl-2-oxo-6-p-toluidino-3-azabenzanthrone and the green dye 1,4-dihydroxy-5,8-di-p-toluidino anthraquinone; the optical density of said polyester substrate being at most about 0.3.

9. A photosensitized polyester film article comprising a colored polyester film substrate and, on at least one side of said film substrate, a photosensitive layer; said polyester film substrate comprising at least two different types of dyes selected from (a) the group of azabenzanthrone and diazabenzanthrone dyes having structure:

(A)

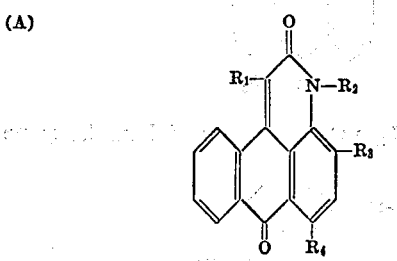

or (B)

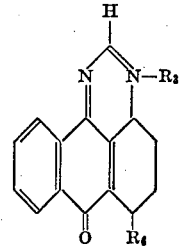

wherein $R_1$, $R_2$, $R_3$, and $R_4$ are selected from the group consisting of H, —OH, —NH$_2$, p-NO$_2$—⟨⟩—, p-CN—⟨⟩—, cyano, —C(=O)—$R_5$, N-3-(dimethylamino)-propylamino, N-(2,4-dichlorobenzoyl)amino, 4'-t-amylanilino, p-chloroanilino, 2,4-dimethylanilino, p-(1-methylbutyl)anilino, o-, m-, and p-toluidino, amido, sulfonamido, alkyl, aryl, and alkaryl; at least one of $R_1$, $R_2$, $R_3$ and $R_4$ being other than H, and at most two of $R_1$, $R_2$, $R_3$, and $R_4$ having radical weights above about 70; and $R_5$ is the same as $R_1$, $R_2$, $R_3$, or $R_4$; and (b) at least one green dye selected from the group consisting of 1,4-dihydroxy-5,8-di-p-toluidino anthraquinone and 1,4-di-p-butyl anilino-5,8-dihydroxy anthraquinone, said green dye being 1,4-dihydroxy-5,8-di-p-toluidino anthraquinone when said azabenzanthrone or diazabenzanthrone dye is selected from group (A) or (B), and when said green dye is 1,4-di-p-butyl anilino-5,8-dihydroxy anthraquinone, said azabenzanthrone or diazabenzanthrone dye is selected from group (B).

10. A photosensitive polyester film article as in claim 9, wherein said polyester is a linear polyester of repeating polymethylene glycol and diacyl radicals, the number of carbon atoms in the polymethylene groups being from 2 to 8.

11. A photosensitive polyester film article as in claim 9, wherein said polyester is poly(ethylene terephthalate).

12. A photosensitive polyester film article as in claim 9, wherein said polyester is poly(1,4-dimethylenecyclohexylene terephthalate).

13. A photosensitized polyester film article containing a neutral in color polyester film substrate and, on at least one side of said film substrate, a photosensitive layer; said polyester film substrate comprising the red dye 2,3-dihydro-3-methyl-2-oxo-6-p-toluidino-3-azabenzanthrone and the green dye 1,4-dihydroxy-5,8-di-p-toluidino anthraquinone.

14. A photosensitized polyester film article as in claim 13 wherein said polyester is poly(ethylene terephthalate).

15. A photosensitized polyester film article as in claim 13, wherein said polyester is poly(1,4-dimethylene-cyclohexylene terephthalate).

References Cited
UNITED STATES PATENTS

| | | | |
|---|---|---|---|
| 3,324,132 | 6/1967 | Cooper et al. | 260—278 |
| 3,488,195 | 1/1970 | Hunter | 96—87 R |
| 2,627,088 | 2/1953 | Alles et al. | 96—84 R |
| 2,622,026 | 12/1952 | Hunter et al. | 96—84 R |
| 2,508,295 | 5/1950 | Reckmeyer | 96—84 R |
| 3,728,124 | 4/1973 | Whyte | 96—84 R |

RONALD H. SMITH, Primary Examiner

U.S. Cl. X.R.

96—87 R; 260—40 R

UNITED STATES PATENT OFFICE
CERTIFICATE OF CORRECTION

Patent No. 3,822,132　　　　　　Dated July 2, 1974

Inventor(s) C. Shelburn Hunter

It is certified that error appears in the above-identified patent and that said Letters Patent are hereby corrected as shown below:

Column 12, delete the formula at the top of column 12, and substitute therefor

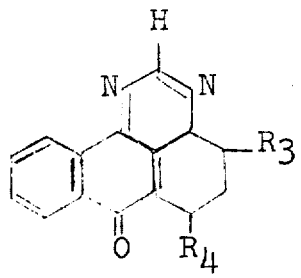

Signed and sealed this 15th day of October 1974.

(SEAL)
Attest:

McCOY M. GIBSON JR.
Attesting Officer

C. MARSHALL DANN
Commissioner of Patents